(12) United States Patent
Shi et al.

(10) Patent No.: US 10,592,458 B1
(45) Date of Patent: Mar. 17, 2020

(54) BIMODAL IMPEDANCE MATCHING TERMINATORS

(71) Applicant: Apple Inc., Cupertino, CA (US)

(72) Inventors: Hao Shi, Mountain View, CA (US); Gary S. Thomason, Boulder Creek, CA (US); Abhilash Rajagopal, San Jose, CA (US); Jason W. Leung, San Francisco, CA (US); Koussalya Balasubramanian, Santa Clara, CA (US); Venus Kumar, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/134,811

(22) Filed: Sep. 18, 2018

(51) Int. Cl.
| | | |
|---|---|---|
| *H03K 17/16* | (2006.01) | |
| *H03K 19/003* | (2006.01) | |
| *G06F 13/40* | (2006.01) | |
| *H04L 25/02* | (2006.01) | |
| *H01R 13/646* | (2011.01) | |

(52) U.S. Cl.
CPC ....... *G06F 13/4086* (2013.01); *H01R 13/646* (2013.01); *H04L 25/0298* (2013.01)

(58) Field of Classification Search
None
See application file for complete search history.

(56) References Cited

U.S. PATENT DOCUMENTS

| | | | |
|---|---|---|---|
| 6,157,688 A | 12/2000 | Tamura et al. | |
| 6,700,823 B1 * | 3/2004 | Rahman | H04L 25/0274 365/154 |
| 6,978,328 B1 | 12/2005 | Osaka et al. | |
| 7,129,924 B2 | 10/2006 | Pai et al. | |
| 7,633,312 B2 * | 12/2009 | Saeki | H04L 25/0282 326/83 |
| 7,679,455 B2 | 3/2010 | Huang et al. | |
| 7,772,876 B2 * | 8/2010 | Nguyen | H04L 25/0278 326/30 |
| 8,664,973 B2 | 3/2014 | Ali et al. | |
| 9,246,477 B2 | 1/2016 | Li et al. | |
| 9,338,036 B2 | 5/2016 | Poulton et al. | |
| 9,467,310 B2 | 10/2016 | Bankman et al. | |
| 10,235,523 B1 | 3/2019 | Keller et al. | |
| 2002/0149402 A1 | 10/2002 | Martin et al. | |
| 2004/0119553 A1 * | 6/2004 | Nishimura | H01P 1/26 333/22 R |
| 2016/0294123 A1 * | 10/2016 | Gajda | G06F 13/4081 |

* cited by examiner

*Primary Examiner* — Anh Q Tran
(74) *Attorney, Agent, or Firm* — Treyz Law Group, P.C.; Michael H. Lyons

(57) ABSTRACT

A data network may include a data bus and network nodes. The data bus may be a differential data bus having first and second differential signal lines that convey differential signals between the nodes. A bimodal impedance terminator may be coupled to the first and second differential signal lines at one or both ends of the data bus. The bimodal impedance terminator may include a first resistor coupled between the first differential signal line and a circuit node and a second resistor coupled between the second differential signal line and the circuit node. A capacitor may be coupled between the circuit node and ground. A third resistor may be coupled between the circuit node and ground in series with the capacitor. The bimodal impedance terminator may terminate both the differential-mode impedance and the common-mode impedance of the data bus to reduce signal reflections at the ends of the data bus.

23 Claims, 13 Drawing Sheets

BIMODAL IMPEDANCE MATCHING TERMINATORS

FIELD

This relates generally to data networks including data networks having differential data paths.

BACKGROUND

Data networks include a number of network nodes coupled together over a data path such as a multi-point bus. In some scenarios, data networks are implemented using differential data paths. Differential data paths include a differential pair of signal lines. The differential pair of signal lines conveys differential signals between the network nodes. The differential pair of signal lines is characterized by a differential-mode impedance and a common-mode impedance.

If care is not taken, differential-mode impedance discontinuities at the ends of the data path can reflect the differential signals directly. Common-mode impedance discontinuities at the ends of the data path can reflect common-mode signals that are converted into differential noise and introduce errors in data conveyed over the data path. Impedance discontinuities thus leave the data path susceptible to external interference.

SUMMARY

A system may include a data network and other components. The data network may include network nodes and a data path such as a multi-point bus. The data path may have first and second ends. The network nodes may be coupled to the data path between the first and second ends. The data path may be a differential data path having first and second differential signal lines that convey differential signals between the network nodes.

A bimodal impedance terminator may be coupled to the first and second differential signal lines at one or both ends of the data path. The bimodal impedance terminator may include a first resistor coupled between the first differential signal line and a circuit node and a second resistor coupled between the second differential signal line and the circuit node. A capacitor may be coupled between the circuit node and a reference potential such as ground. A third resistor may be coupled between the circuit node and ground in series with the capacitor. The bimodal impedance terminator may terminate both the differential-mode impedance and the common-mode impedance of the data path. In practical differential lines with minor imbalances, terminating both the differential-mode impedance and the common-mode impedance of the data path serves to reduce or minimize signal reflections at the ends of the data path and reduces or minimizes susceptibility of the data path to external electromagnetic noise.

The bimodal impedance terminator may be integrated within a connector that is configured to be coupled to (e.g., plugged into or mounted to) the first and second differential signal lines. The connector may have ground contacts that couple a cable shield or dedicated ground wire for the data path to ground. If desired, the connector may also couple a network node to the data path.

DETAILED DESCRIPTION

A system may include a data network and other components. The data network may include a data path such as a multi-point bus and two or more network nodes coupled to the data path. The network nodes may include one or more electronic devices or other electronic components. The data path may be a differential data path that includes a differential pair of signal lines. Differential signals may be conveyed between the network nodes over the differential pair of signal lines.

The differential pair of signal lines may have opposing first and second ends. Each of the network nodes may be coupled to the differential pair of signal lines between the first and second ends in a stub-node configuration. Impedance matching terminators (sometimes referred to herein as impedance terminators) may be coupled to the first and second ends to terminate the impedance of the differential pair of signal lines and to thereby reduce or minimize signal reflections at the first and second ends.

The impedance terminators may include circuitry for matching both the differential-mode and the common-mode impedance of the differential data path. Because the impedance terminators are configured to match both the differential and common mode impedances of the data path, the impedance terminators may sometimes be referred to herein as bimodal impedance terminators, bimodal impedance matching circuitry, or bimodal impedance matching circuits.

Figure 1:
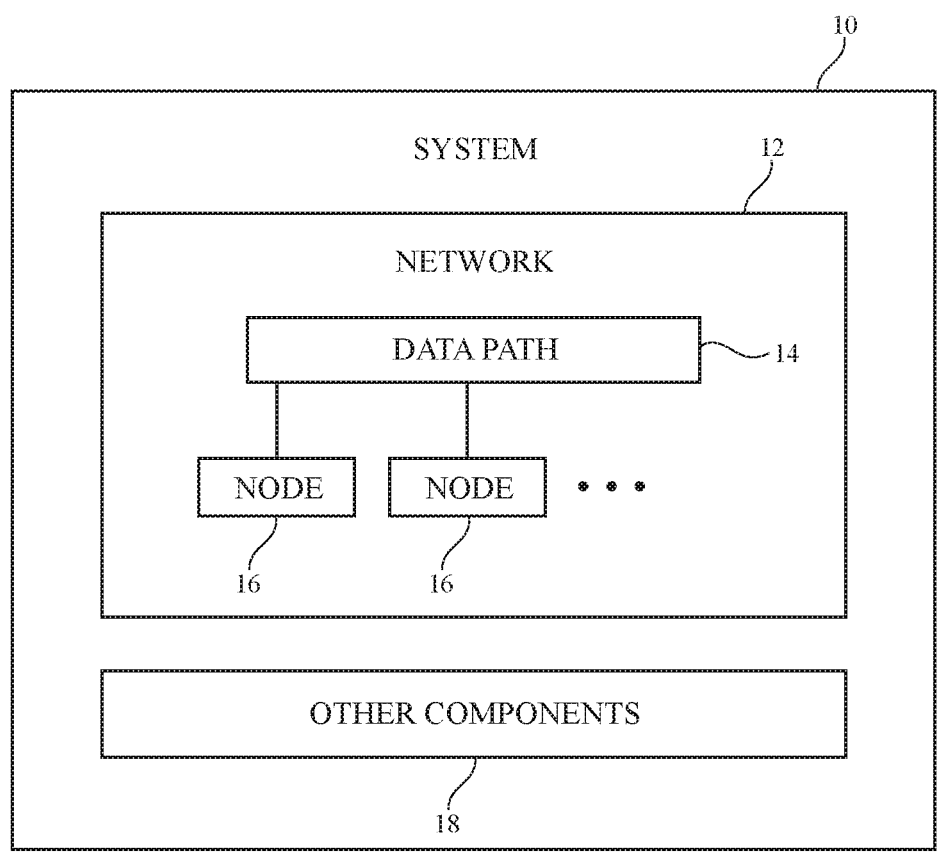
FIG. 1 is a schematic diagram of an illustrative system having a network and other components in accordance with some embodiments.

An illustrative system that may include a network with a differential data path and bimodal impedance terminators is shown in FIG. 1. As shown in FIG. 1, system 10 may include a data network such as network 12 and other components such as components 18. System 10 may include one or more electronic devices (e.g., system 10 may be a desktop computer, laptop computer, network data center, server farm, network in a campus, building, vehicle, etc.).

System 10 has communications paths such as one or more data paths 14. System 10 may include two or more network nodes such as nodes 16 coupled to data path 14. Data path 14 may, for example, include parallel signal lines that form a data bus for network 14 and system 10. The parallel signal lines may include a differential pair of signal lines for conveying differential signals between two or more nodes 16 (e.g., data path 14 may be a multi-point differential bus). The differential signals may be used to convey communications data, control signals, sensor data, or any other desired information between nodes 16. The signal lines of data path 14 may include conductive wires or other conductors formed within one or more cables (e.g., Ethernet cables, coaxial cables, etc.), conductive traces on flexible and/or rigid printed circuits, and/or combinations of these structures. The signal lines may be arranged in a twisted pair configuration if desired. Connectors may be used to mechanically couple data path 14 to nodes 16 and/or to other network components.

Nodes 16 may include portable electronic devices such as laptop computers, cellular telephones, media players, wristwatch devices, head-mounted equipment such as goggles or headphones, larger electronic devices such as desktop computers, servers, line cards on a network rack, computers embedded within computer monitors, televisions, set-top boxes, gaming devices, computers embedded within a kiosk, vehicle network(s), accessories such as computer mice, keyboards, remote controls, or other accessories, electronic components such as sensors (e.g., image sensors, three-dimensional depth sensors, gaze tracking sensors, lidar sensors, radar sensors, inertial/motion sensors such as accelerometers, gyroscopes, or compasses, speedometers, odometers, ambient light sensors, infrared sensors, solar cells, proximity sensors, optical sensors, temperature sensors, magnetic sensors, ultrasonic sensors, microphones, audio sensors, humidity sensors, etc.), wireless communications circuitry (e.g., radio-frequency transceivers, AM/FM radio receivers, satellite radio receivers, satellite television receivers, satellite navigation receivers such as Global Positioning System or Global Navigation Satellite System receivers, wireless local area network transceivers, cellular telephone transceivers, wireless personal area network transceivers such as Bluetooth® transceivers, millimeter wave transceivers, near-field communications transceivers, optical signal transceivers, antennas, etc.), vehicle control components (e.g., steering control components, engine control components, cruise (speed) control components, air flow control components, power window motors, windshield wiper motors, brake control components, seat adjustment components, etc.), output devices (e.g., display components such as liquid crystal displays or light emitting diode displays, lights such as status indicator lights, cabin lights, or headlights, speaker components, haptic feedback and alert components, etc.), wireless charging circuitry for wirelessly charging portable electronic devices or other components in system 10, storage and processing circuits (e.g., processing circuitry such as one or more microprocessors, signal processors, microcontrollers, baseband processors, audio chips, and power management units, memory such as non-volatile memory and volatile memory, etc.), buttons, touch input devices, and/or other components coupled to data path 14.

System 10 may include other components 18 that are not a part of network 12. Other components 18 may include cosmetic structures, engine structures, wheels, input-output devices (e.g., sensor circuitry, communications circuitry, output devices, and/or input devices separate from network 12), and/or support structures used in mechanically supporting some or all of the components of system 10 such housing structures (e.g., conductive and/or dielectric housing walls), chassis structures (e.g., a metal chassis or frame for system 10), dashboard structures, windows, furniture, etc. If desired, system 10 may include multiple separate or interconnected networks 12. The example of FIG. 1 is merely illustrative.

Figure 2:
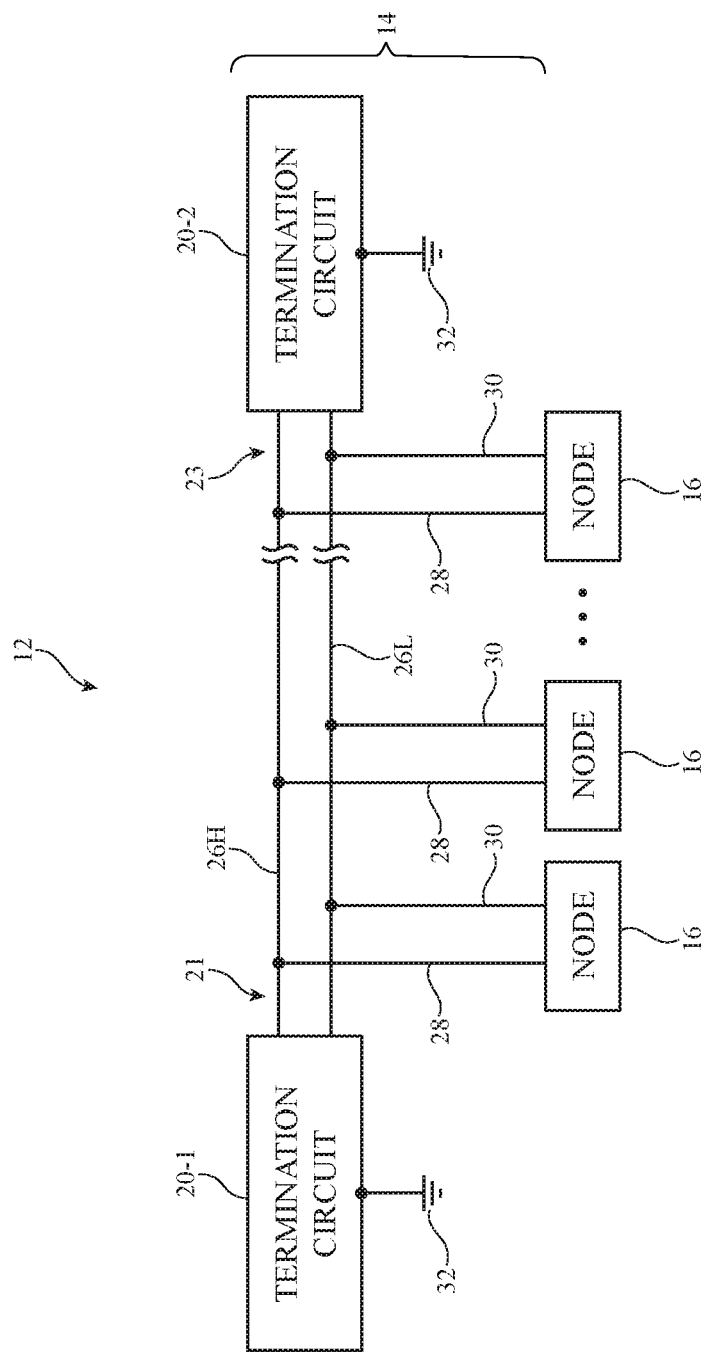
FIG. 2 is a diagram of an illustrative network having a differential data path, network nodes, and bimodal impedance terminators in accordance with some embodiments.

FIG. 2 is a diagram showing how nodes 16 of system 10 may be coupled to data path 14. As shown in FIG. 2, data path 14 (sometimes referred to herein as data bus 14, communications bus 14, communications path 14, signal path 14, or bus 14) may include differential signal lines 26H and 26L (e.g., a differential pair of conductive lines). Nodes 16 may each be coupled to differential signal line 26H over a corresponding signal path 28 and may each be coupled to differential signal line 26L over a corresponding signal path 30 (e.g., at locations between first end 21 and second end 23 of data path 14).

Differential signal lines 26H and 26L may convey differential signals between nodes 16. The differential signals include a first signal conveyed over differential signal line 26H and a complementary second signal (e.g., a signal of equal and opposite magnitude to the first signal at any given time) conveyed over differential signal line 26L (e.g., the first and second signals form a differential pair of signals). Differential signal line 26H may sometimes be referred to herein as high signal line 26H whereas differential signal line 26L is sometimes referred to herein as low signal line 26L.

In this way, any desired number of nodes 16 may be coupled to differential signal lines 26H and 26L between ends 21 and 23 of data path 14. If care is not taken, impedance discontinuities at ends 21 and 23 of data path 14 can reflect the signals conveyed over differential signal lines 26H and 26L. The reflected signals may undesirably interfere with the operation of nodes 16 and can introduce errors into the conveyed signals.

In order to reduce or minimize these impedance discontinuities, data path 14 may include one or more impedance termination circuits (impedance terminators) 20 such as first termination circuit 20-1 and second termination circuit 20-2 of FIG. 2. First termination circuit 20-1 may be coupled to (between) differential signal lines 26H and 26L at end 21 whereas second termination circuit 20-2 is coupled to (between) differential signal lines 26H and 26L at end 23 of data path 14. In this way, termination circuits 20-1 and 20-2 may form end nodes of network 12 whereas nodes 16 form stub nodes of network 12. Termination circuits 20-1 and 20-2 may each be coupled to ground 32 and may be configured to couple desired impedances between differential signal lines 26H and 26L at ends 21 and 23 of data path 14. The impedances may be selected to reduce or minimize impedance discontinuity and thus signal reflection at ends 21 and 23 of data path 14.

In some scenarios, a single resistor such as a 120-ohm resistor is coupled between the differential signal lines to terminate each end of the data path. In other scenarios, a split termination scheme is used in which a shunting capacitor is coupled to one differential signal line through a first 60-ohm resistor and to the other differential signal line through a second 60-ohm resistor. In other implementations, resistors of other values can be used. These arrangements may terminate the differential-mode impedance of the differential signal lines, but are incapable of terminating the common-mode impedance of the differential signal lines. If care is not taken, remaining common-mode impedance discontinuities will continue to reflect differential signals at the ends of the data path. It may therefore be desirable to be able to provide data path 14 with termination circuits that terminate both the differential-mode impedance and the common-mode impedance of differential signal lines 26H and 26L.

Figure 3:
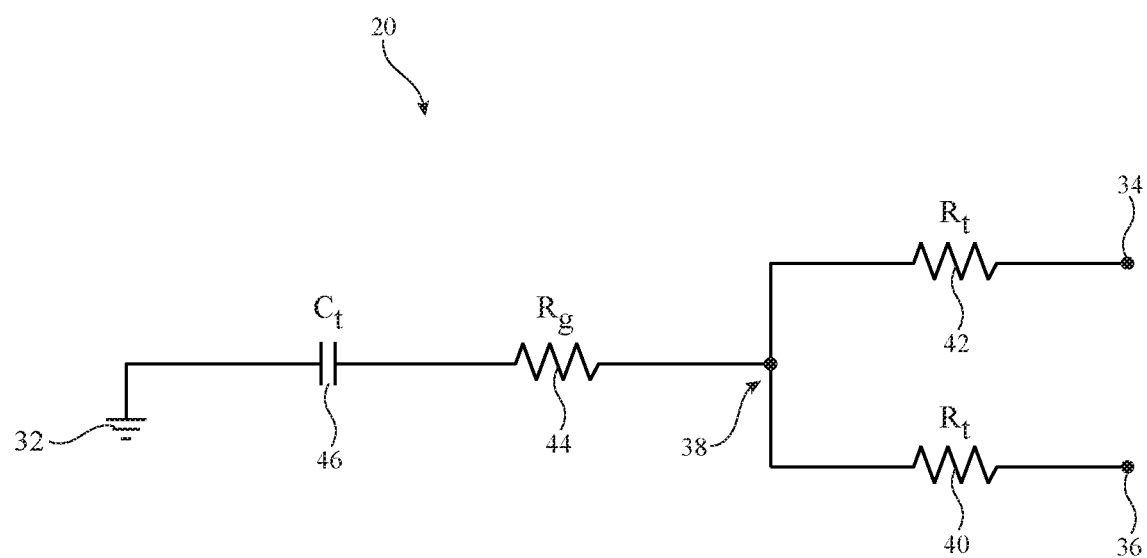
FIG. 3 is a circuit diagram of an illustrative bimodal impedance terminator in accordance with some embodiments.

FIG. 3 is a circuit diagram of an impedance termination circuit 20 having both differential-mode and common-mode termination capabilities. As shown in FIG. 3, termination circuit 20 (e.g., termination circuit 20-1 or 20-2 of FIG. 2) may include a capacitor such as capacitor 46 and first, second, and third resistors such as resistors 44, 40, and 42. Capacitor 46 may be coupled in series between ground 32 and first resistor 44. First resistor 44 may be coupled in series between capacitor 46 and circuit node 38. Second resistor 40 may be coupled in series between circuit node 38 and terminal 36. Third resistor 42 may be coupled in series between circuit node 38 and terminal 34. Terminal 34 may be coupled to differential signal line 26H whereas terminal 36 is coupled to differential signal line 26L (FIG. 2).

Capacitor 46 of FIG. 3 may have a capacitance $C_t$. Capacitance $C_t$ may be, for example, between 4.6 nF and 4.8 nF (e.g., 4.7 nF), between 4.5 nF and 4.9 nF, between 4.0 nF and 5.0 nF, between 3.0 nF and 6.0 nF, between 1.0 nF and 10.0 nF, less than 3.5 nF, or greater than 6.0 nF. Second resistor 40 and third resistor 42 may both have resistance $R_t$. Resistance $R_t$ may be equal to one-half of the differential-mode impedance $Z_{diff}$ of differential signal lines 26H and 26L. Resistance $R_t$ may be approximately equal to this value if desired (e.g., within 20% of one-half of differential-mode impedance $Z_{diff}$, within 10% of one-half of differential-mode impedance $Z_{diff}$, etc.). As an example, resistance $R_t$ may be between 55 ohms and 65 ohms (e.g., 60 ohms in scenarios where $Z_{diff}$ is equal to 120 ohms), between 50 ohms and 70 ohms, between 45 ohms and 75 ohms, less than 45 ohms, or greater than 75 ohms.

First resistor 44 may have resistance $R_g$. Resistance $R_g$ may be equal to the difference between the common-mode impedance $Z_{comm}$ of differential signal lines 26H and 26L and one-quarter of differential-mode impedance $Z_{diff}$ (e.g., resistance $R_g$ may be set to $Z_{comm}-0.25*Z_{diff}$, where "*" is the multiplication operator). Resistance $R_g$ may be approximately equal to this value if desired (e.g., within 10-20% of $Z_{comm}-0.25*Z_{diff}$, within 10% of $Z_{comm}-0.25*Z_{diff}$, etc.). As an example, resistance $R_g$ may be between 115 ohms and 125 ohms (e.g., 120 ohms), between 110 ohms and 130 ohms, between 100 ohms and 140 ohms, less than 100 ohms, between 140 ohms and 200 ohms, between 200 ohms and 300 ohms, between 230 ohms and 270 ohms (e.g., 250 ohms), or greater than 270 ohms. The example of FIG. 3 is merely illustrative. If desired, first resistor 44 may be coupled between capacitor 46 and ground 32 (e.g., the locations of resistor 44 and capacitor 46 in FIG. 3 may be swapped).

Resistor 40, resistor 42, and capacitor 46 may serve to terminate the differential-mode impedance of differential signal lines 26H and 26L. Coupling first resistor 44 in series between circuit node 38 and ground 32 may serve to terminate the common-mode impedance of differential signal lines 26H and 26L (e.g., without compromising the differential-mode termination provided by resistors 40 and 42). Because termination circuit 20 is capable of terminating both the common-mode impedance and the differential-mode impedance of differential signal lines 26L and 26H, termination circuit 20 may sometimes be referred to herein as bimodal impedance terminator circuit 20, bimodal impedance terminator 20, bimodal terminator 20, or bimodal terminator circuit 20.

Consider, for example, transmission line equivalent circuit models of bimodal impedance terminator 20 when coupled to differential signal lines 26L and 26H of FIG. 2. The transmission line equivalent circuit models may include a differential-mode equivalent circuit that models the differential-mode operation of bimodal impedance terminator 20 and a common-mode equivalent circuit that models the common-mode operation of bimodal impedance terminator 20. A semi-infinite length positive transmission line is used in the models to represent differential signal line 26H and a semi-infinite length negative transmission line is used in the models to represent differential signal line 26L.

In the differential-mode equivalent circuit, a resistance of $2*R_t$ is coupled in series between terminal 34 (the positive transmission line) and terminal 36 (the negative transmission line). Resistance $R_g$, capacitance $C_t$, and ground 32 of FIG. 3 are omitted from the differential-mode equivalent circuit. In the common-mode equivalent circuit, a resistance of $R_t/2$ is coupled in series between circuit node 38 and terminal 34. Resistance $R_g$ is coupled in series between circuit node 38 and capacitance $C_t$. Capacitance $C_t$ is coupled in series between resistance $R_g$ and ground 32.

The positive and negative transmission lines in the differential-mode and common-mode equivalent circuits exhibit a per-unit-length self-capacitance C, a per-unit-length mutual-capacitance $C_m$, a per-unit-length self-inductance L, and a per-unit-length mutual-inductance $L_m$. The positive and negative transmission lines in the differential-mode equivalent circuit exhibit a differential-mode impedance of $Z_{diff}$, given by equation 1. The positive and negative transmission lines in the common-mode equivalent circuit exhibit a common-mode impedance of $Z_{comm}$, given by equation 2.

$$Z_{diff}=2*\text{SQRT}([L-L_m]/[C+C_m]) \quad (1)$$

$$Z_{comm}=0.5*\text{SQRT}([L+L_m]/[C-C_m]) \quad (2)$$

In equations 1 and 2, SQRT( ) is the square-root operator and "/" is the division operator. The common-mode equivalent circuit can be used to derive the common-mode input impedance $Z_{in,c}$ of bimodal impedance terminator 20, which is given by equation 3.

$$Z_{in,c}=(R_t/2)+R_g+1/(j*\omega*C_t) \quad (3)$$

In equation 3, w is the angular frequency of the signals on the positive and negative transmission line conductors and j is equal to SQRT(−1). The amount of signals that are reflected at bimodal impedance terminator 20 back towards differential signal lines 26H and 26L (e.g., back towards the positive and negative transmission line conductors of the equivalent circuit models) is characterized by reflection coefficient $\Gamma_C$, as given by equation 4.

$$\Gamma_C = (Z_{in,c} - Z_{comm})/(Z_{in,c} + Z_{comm}) \quad (4)$$

Reflection coefficient $\Gamma_C$ is a complex number having a magnitude $|\Gamma_C| = \mathrm{SQRT}(W^2 + Y^2)$, where W is the real part of reflection coefficient $\Gamma_C$ and Y is the imaginary part of reflection coefficient $\Gamma_C$. Substituting equation (3) into equation (4), the magnitude $|\Gamma_C|$ of reflection coefficient $\Gamma_C$ is given by equation 5.

$$|\Gamma_C| = \mathrm{SQRT}([\omega^2 * C_t^2 * (R_t/2 + R_g - Z_{comm})^2 + 1]/[\omega^2 * C_t^2 * (R_t/2 + R_g + Z_{comm})^2 + 1]) \quad (5)$$

Assuming that common-mode impedance $Z_{comm}$ is greater than $R_t/2$, $R_g$ can be set equal to $Z_{comm} - R_t/2$. This allows magnitude $|\Gamma_C|$ of reflection coefficient $\Gamma_C$ to be simplified, as shown by equation 6.

$$|\Gamma_C| = \mathrm{SQRT}(1/[\omega^2 * C_t^2 * (2*Z_{comm})^2 + 1]) \quad (6)$$

Figure 4:
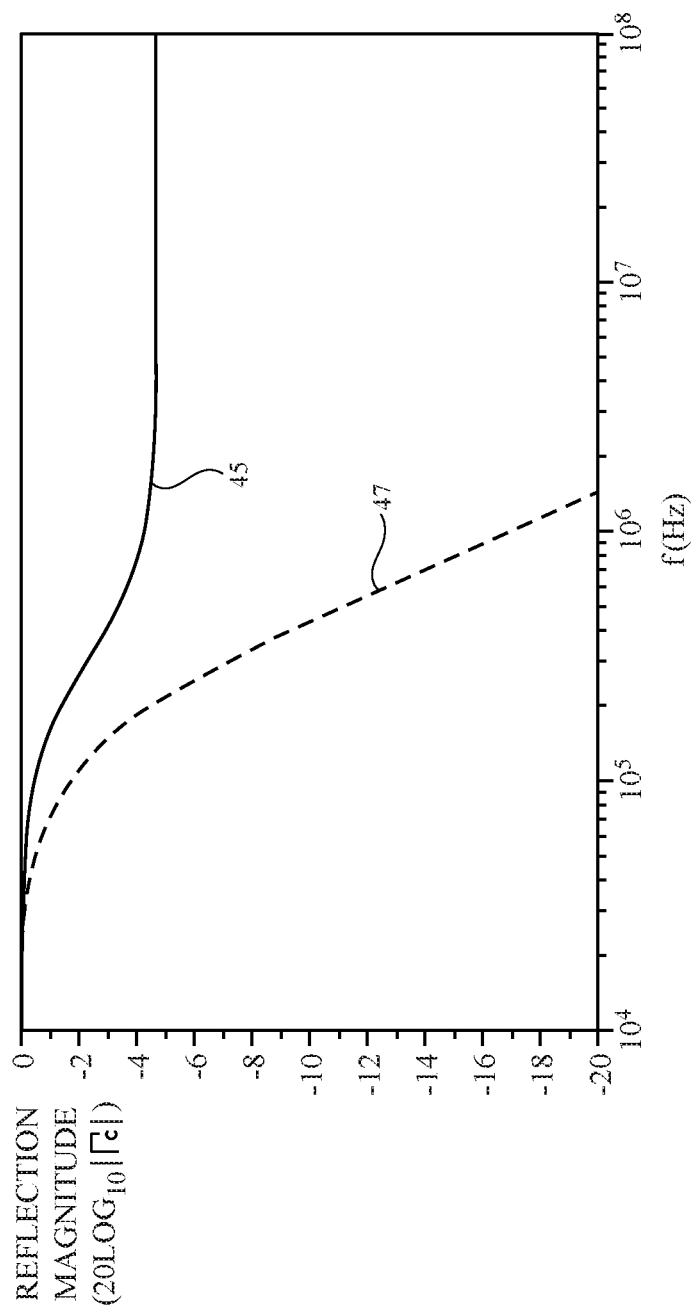
FIG. 4 is a plot of illustrative network performance (signal reflection) as a function of frequency for a network having a bimodal impedance terminator in accordance with some embodiments.

FIG. 4 is a plot of the magnitude of the reflection coefficient at the end of differential signal lines 26H and 26L as a function of frequency under different impedance termination schemes. As shown in FIG. 4, frequency f is plotted on the X-axis and the magnitude of the reflection coefficient is logarithmically plotted on the Y-axis (e.g., where $20*\mathrm{LOG}_{10}$ of the reflection coefficient magnitude is plotted on the Y-axis).

Curve 45 represents the magnitude of the common mode reflection coefficient in scenarios where a split termination scheme is used (e.g., scenarios in which a shunting capacitor is coupled to one differential signal line through a first $R_t$ resistor and to the other differential signal line through a second $R_t$ resistor without resistor 44 of FIG. 3). As shown by curve 45, a relatively high amount of signal reflection is present on the differential signal lines, particularly at higher frequencies such as frequencies over 100 kHz. This reflection is generated by the presence of a common-mode impedance discontinuity at the end of differential signal lines 26H and 26L (e.g., because the split termination scheme is incapable of sufficiently terminating the common-mode impedance of the signal lines). Curve 45 of FIG. 4 is generated assuming that $Z_{diff}$ is 120-ohm, $Z_{comm}$ is 115-ohm, and $C_t$ is 4.7-nF, as an example.

Curve 47 represents magnitude $|\Gamma_C|$ of common mode reflection coefficient $\Gamma_C$ in scenarios where bimodal impedance terminator 20 of FIG. 3 is coupled to differential signal lines 26H and 26L. Curve 47 may, for example, be generated using equation 6. Because bimodal impedance terminator 20 sufficiently terminates both the common-mode impedance and the differential-mode impedance of differential signal lines 26H and 26L, there is significantly less signal reflection on the differential signal lines relative to the arrangement associated with curve 45, particularly for frequencies over 100 kHz. In this way, bimodal impedance terminator 20 may reduce or minimize signal reflections on data path 14 (FIG. 1) across a wide range of frequencies. The example of FIG. 4 is merely illustrative. In general, curves 45 and 47 may have other shapes (e.g., depending on the magnitude of $C_t$, $R_g$, and $R_t$).

Bimodal impedance terminator 20 may be integrated within network 12 in any desired manner. In one suitable arrangement which is sometimes described herein as an example, bimodal impedance terminator 20 may be integrated within a connector (adapter) for network 12. The connector may be coupled to (e.g., plugged into) data path 14 so that differential signal lines 26H and 26L are coupled to terminals 34 and 36 of bimodal impedance terminator 20 (FIG. 3), respectively, while also optionally coupling other components such as additional cabling, additional segments of differential signal lines 26H and 26L, additional nodes 16 (FIG. 2), and/or other components to data path 14.

Figure 5:
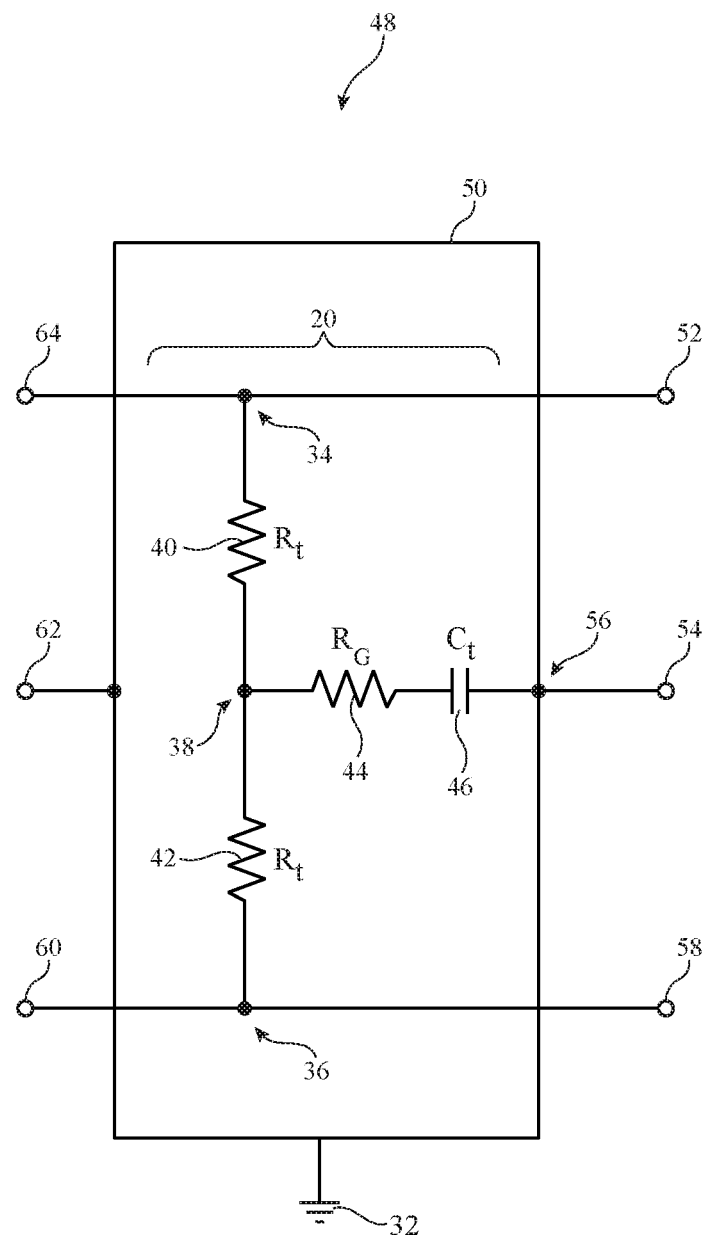
FIG. 5 is a circuit diagram showing how an illustrative bimodal impedance terminator may be integrated within a connector having a grounded shield in accordance with some embodiments.

FIG. 5 is a circuit diagram showing how bimodal impedance terminator 20 may be integrated within a connector for network 12. As shown in FIG. 5, bimodal impedance terminator 20 may be integrated into a connector such as connector 48. Connector 48 may include a first contact 52, a second contact 58, a third contact 60, and a fourth contact 64. Contacts 60, 52, 58, and 64 may be used to convey differential signals between differential signal lines 26H/26L (FIG. 2) and other portions of network 12 while connector 48 is coupled to (e.g., connected or plugged into) data path 14. Connector 48 can mate with or otherwise be attached (affixed) to another connector that is coupled to ends 21 or 23 of data path 14. Connector 48 may be removable from data path 14 if desired.

For example, contact 52 may be coupled to differential signal line 26H and contact 58 may be coupled to differential signal line 26L of FIG. 2. If desired, contacts 60 and 64 may be coupled to a given node 16 over respective signal paths 28 and 30 of FIG. 2 or may be left floating (i.e., without being in contact with any other components). In scenarios where a given node 16 is coupled to contacts 64 and 60, that node may convey differential signals with the rest of network 12 through connector 48 and over differential signal lines 26H and 26L. In this way, connector 48 may be used to both plug a corresponding node 16 into data path 14 and to terminate differential signal lines 26H and 26L, or may be used to terminate differential signal lines 26H and 26L without plugging any nodes into data path 14.

As shown in FIG. 5, connector 48 may include a grounded shield 50 extending around a periphery of connector 48. Grounded shield 50 may surround bimodal impedance terminator 20 in connector 48. Grounded shield 50 may be coupled to ground 32 (e.g., a reference or ground potential of system 10 such as a metal chassis or other ground plane structures). Grounded shield 50 may be formed from a conductive housing or shell for connector 48, conductive traces, sheet metal structures, and/or any other desired conductive structures. Connector 48 may have a first ground contact 54 and a second ground contact 62 coupled to grounded shield 50. Ground contact 62 may be coupled to a ground terminal on a given node 16 and ground contact 54 may be coupled to a ground conductor in data path 14 if desired (e.g., in scenarios where data path 14 includes a cable shield or dedicated ground wire).

Terminal 34 of bimodal impedance terminator 20 may be coupled to both contacts 64 and 52 of connector 48. Terminal 36 may be coupled to both contacts 60 and 58 of connector 48. In this way, terminals 34 and 36 of bimodal impedance terminator 20 may be coupled to differential signal lines 26H and 26L when connector 48 is connected to data path 14. Capacitor 46 may be coupled to ground 32 via grounded shield 50. In the example of FIG. 5, capacitor 46 and ground contact 54 are both coupled to circuit node 56 on grounded shield 50. This is merely illustrative and, if desired, capacitor 46 may be coupled to other locations on grounded shield 50 or may be coupled to ground 32 separately from grounded shield 50. Contacts 52, 58, 60, and 64 may sometimes be referred to herein as signal contacts, signal ports, signal terminals, input-output (I/O) ports, I/O contacts, I/O terminals, ports, or terminals.

Contacts 52, 54, and 58 may be formed from male connector structures (e.g., pins) that are configured to mate with female connector structures on data path 14, may be formed from female connector structures (e.g., pin receptacles) that are configured to mate with male connector structures on data path 14, or may be formed from other connector structures such as contact pads, conductive adhesive, conductive springs, solder balls, welds, conductive wire, sheet metal, and/or any other desired conductive structures. Similarly, contacts 64, 62, and 60 may be formed from male connector structures that are configured to mate with female connector structures on a given node 16 or elsewhere in network 12, may be formed from female connector structures that are configured to mate with male connector structures on the given node 16 or elsewhere in network 12, or may be formed from other connector structures such as contact pads, conductive adhesive, conductive springs, solder balls, welds, and/or any other desired conductive structures.

Connector 48 may include attachment structures (e.g., clips, adhesive, pins, alignment posts, sockets, fixtures, etc.) that secure connector 48 to a mating connector on data path 14 or elsewhere in network 12 (e.g., to ensure that connector 48 is secured in place and a reliable electrical connection is established between bimodal impedance terminator 20 and differential signal lines 26H and 26L). The attachment structures may also allow connector 48 to be detached from the mating connector if desired. Grounded shield 50 may be omitted if desired (e.g., circuit node 56 may be coupled to ground 32 over other grounding structures).

Integrating bimodal impedance terminator 20 into a connector for network 12 such as connector 48 of FIG. 5 may, for example, serve to reduce the routing complexity of network 12, allow for easy and inexpensive assembly of network 12, and/or allow bimodal impedance terminator 20 to be easily moved to different locations across network 12 over time (e.g., to ensure satisfactory common-mode and differential-mode impedance termination as additional nodes 16 are coupled to or de-coupled from data path 14 and/or as network 12 is upgraded, expanded, contracted, or otherwise altered over time).

If desired, differential signal lines 26H and 26L of data path 14 may be formed from a twisted pair of conductors (e.g., a first wire that forms differential signal line 26H may be twisted around a second wire that forms differential signal line 26L). Forming differential signal lines 26H and 26L from a twisted pair of conductors may serve to reduce or minimize electromagnetic radiation by differential signal lines 26H and 26L, interference from external sources onto differential signal lines 26H and 26L, and/or electromagnetic crosstalk between differential signal lines 26H and 26L, as examples.

If desired, differential signal lines 26H and 26L may be formed within a shielded cable to further isolate the differential signal lines from external electromagnetic energy. The shielded cable may include a shield structure that surrounds differential signal lines 26H and 26L. The shield structure may electromagnetically shield differential signal lines 26H and 26L from electromagnetic noise and interference. The shield structure may include, for example, a conductive braid or other outer conductor that is wrapped around differential signal lines 26H and 26L.

Figure 6:
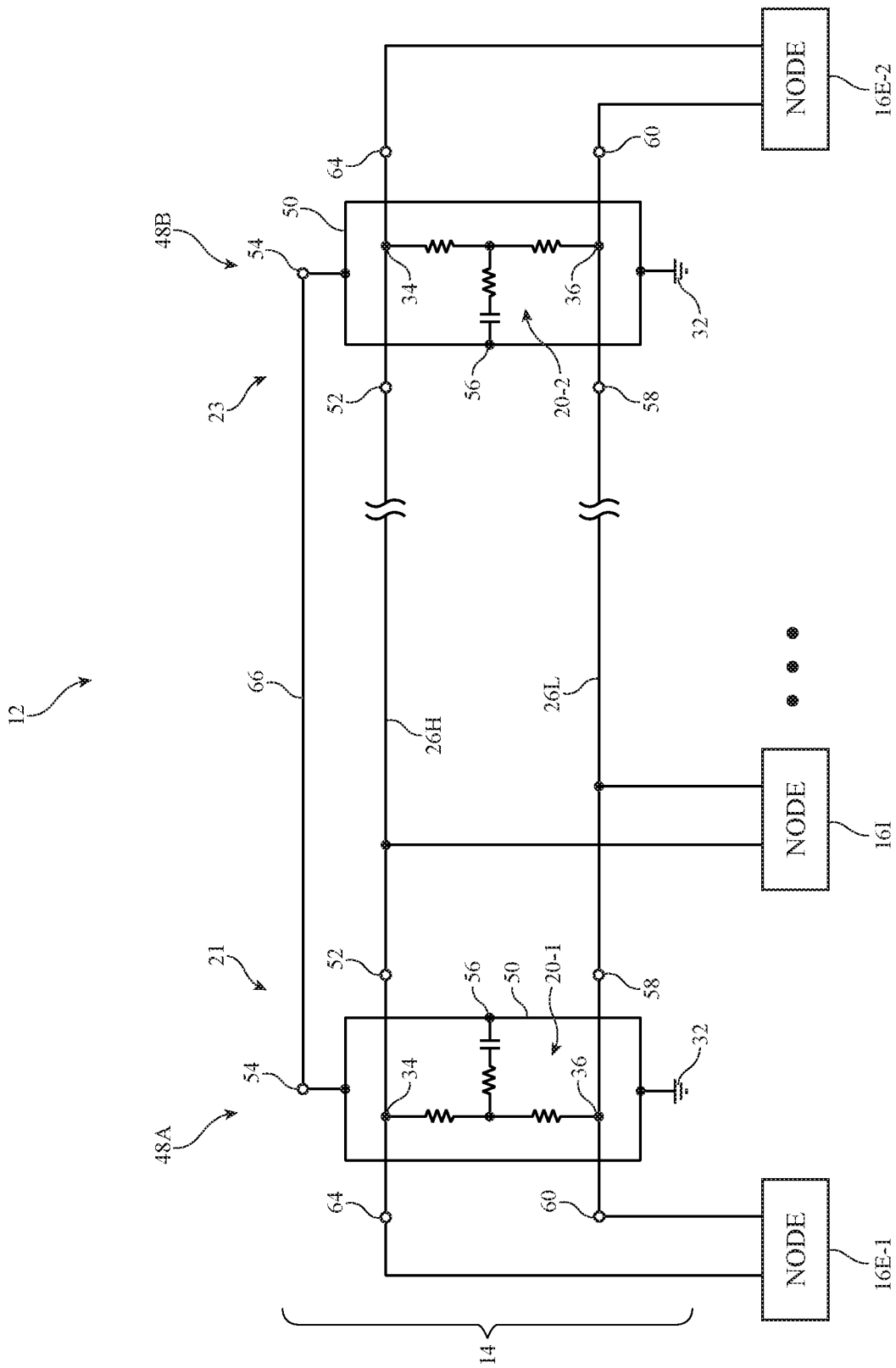
FIG. 6 is a diagram of an illustrative network having a differential data path with a cable shield coupled between bimodal impedance terminators in accordance with some embodiments.

FIG. 6 is a diagram showing how data path 14 may include two connectors coupled together by a shielded cable. As shown in FIG. 6, data path 14 includes a first connector 48 such as connector 48A at end 21 and a second connector 48 such as connector 48B at end 23. Bimodal impedance terminator 20 of FIG. 5 may be integrated within first connector 48A (e.g., as bimodal impedance terminator 20-1 of FIG. 6) and may be integrated within second connector 48B (e.g., as bimodal impedance terminator 20-2 of FIG. 6).

Connectors 48A and 48B in the example of FIG. 6 have been coupled to (e.g., plugged into or mounted to) data path 14 such that contact 52 of connectors 48A and 48B are coupled to differential signal line 26H and such that contact 58 of connectors 48A and 48B are coupled to differential signal line 26L. Nodes 16 that are coupled to differential signal lines 26H and 26L between connectors 48A and 48B may sometimes be referred to herein as internal nodes 161 or stub nodes 161. Network 12 may include any desired number of internal nodes 161.

Nodes 16 that are coupled to differential signal lines 26H and 26L through a corresponding connector 48 may sometimes be referred to herein as end nodes 16E. In the example of FIG. 6, network 12 includes a first end node 16E-1 coupled to contacts 64 and 60 of connector 48A and a second end node 16E-2 coupled to contacts 64 and 60 of connector 48B. End nodes 16E-1 and 16E-2 may include connector structures that mate with the corresponding connector 48 or may be coupled to connector 48 via intervening cabling (e.g., end node 16E-1 may be coupled to a first connector structure at a first end of a cable whereas a second connector structure at a second end of the cable mates with connector 48A to couple end node 16E-1 to contacts 64 and 60). End node 16E-1 and/or end node 16E-2 may be omitted from network 12 if desired.

Data path 14 of FIG. 6 may include cable shield 66. Cable shield 66 may, for example, include a conductive braid or other outer conductor that surrounds differential signal lines 26H and 26L between connectors 48A and 48B. Cable shield 66 may be coupled to ground contact 54 on connectors 48A and 48B (e.g., cable shield 66 may be coupled to ground 32 through grounded shield 50 on each connector 48). Cable shield 66 may thereby be held at a ground potential and may serve to isolate differential signal lines 26H and 26L from external electromagnetic signals. Bimodal impedance terminators 20-1 and 20-2 may terminate the common-mode and differential-mode impedances of differential signal lines 26H and 26L while connectors 48A and 48B also serve to couple end nodes 16E-1 and 16E-2 to data path 14.

Figure 7:
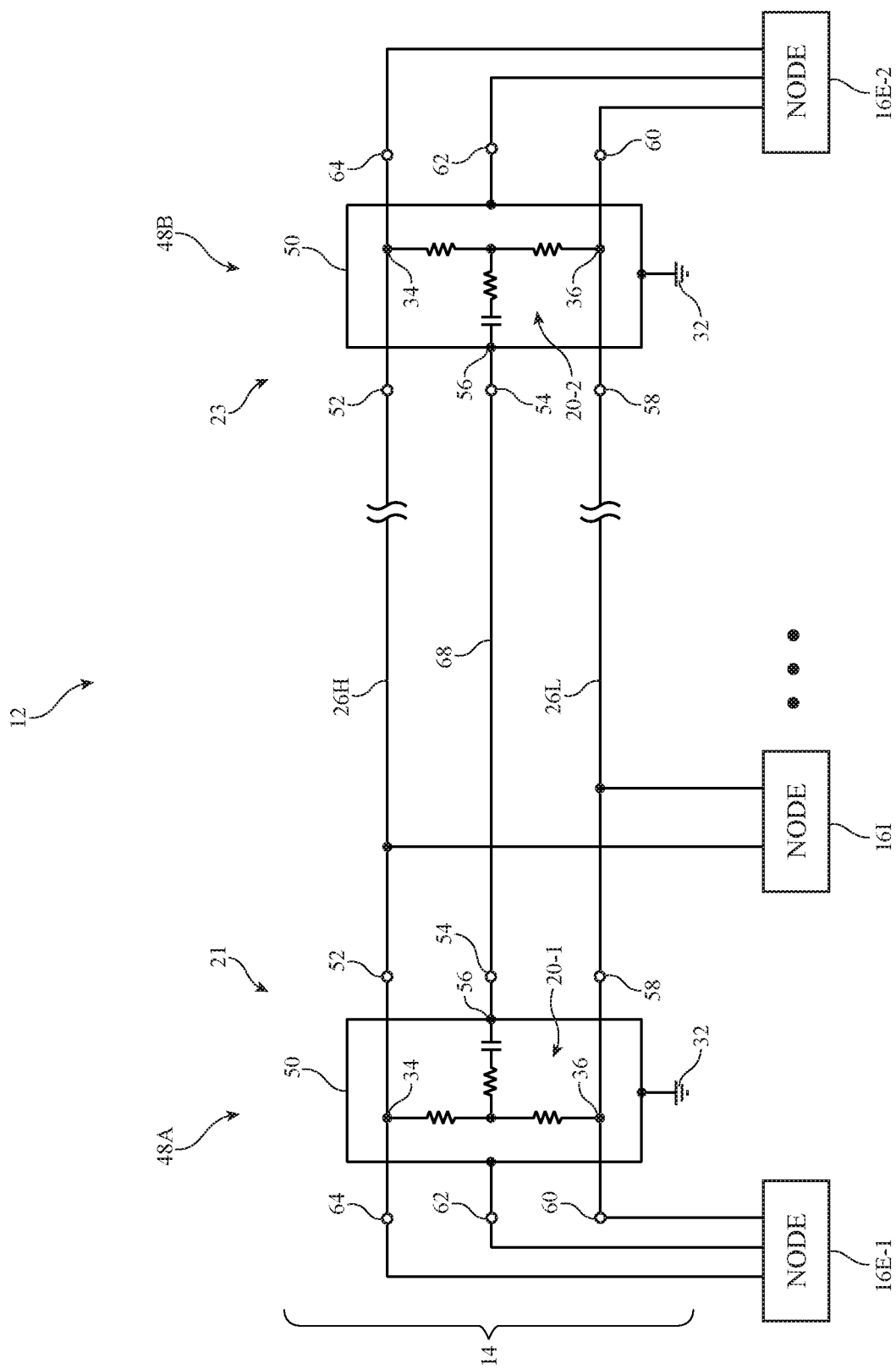
FIG. 7 is a diagram of an illustrative network having a differential data path with a dedicated ground wire coupled between bimodal impedance terminators in accordance with some embodiments.

In another suitable arrangement, data path 14 may include a dedicated ground wire. FIG. 7 is a diagram showing how data path 14 may include two connectors coupled together by a cable having a dedicated ground wire such as dedicated ground wire 68. As shown in FIG. 7, dedicated ground wire 68 is coupled between ground contact 54 on first connector 48A and ground contact 54 on second connector 48B. Ground contact 62 on first connector 48A may be coupled to a ground port on end node 16E-1 and ground contact 62 on second connector 48B may be coupled to a ground port on end node 16E-2. In this way, the end node ground ports and dedicated ground wire 68 may be coupled to ground 32 (e.g., through grounded shield 50 of connectors 48A and 48B) and may thereby be held at a ground (reference) potential. Dedicated ground wire 68 may help the differential pair of signal lines to exhibit a controlled, constant-valued, common-mode impedance, which facilitates the application of bimodal termination.

The example of FIG. 7 is merely illustrative. If desired, one or both of end nodes 16E-1 and 16E-2 may be omitted. Differential signal lines 26H/26L and dedicated ground wire 68 may be surrounded by a cable shield such as cable shield 66 of FIG. 6 if desired. In another suitable arrangement, data path 14 may be formed from an unshielded cable without a dedicated ground wire.

Figure 8:
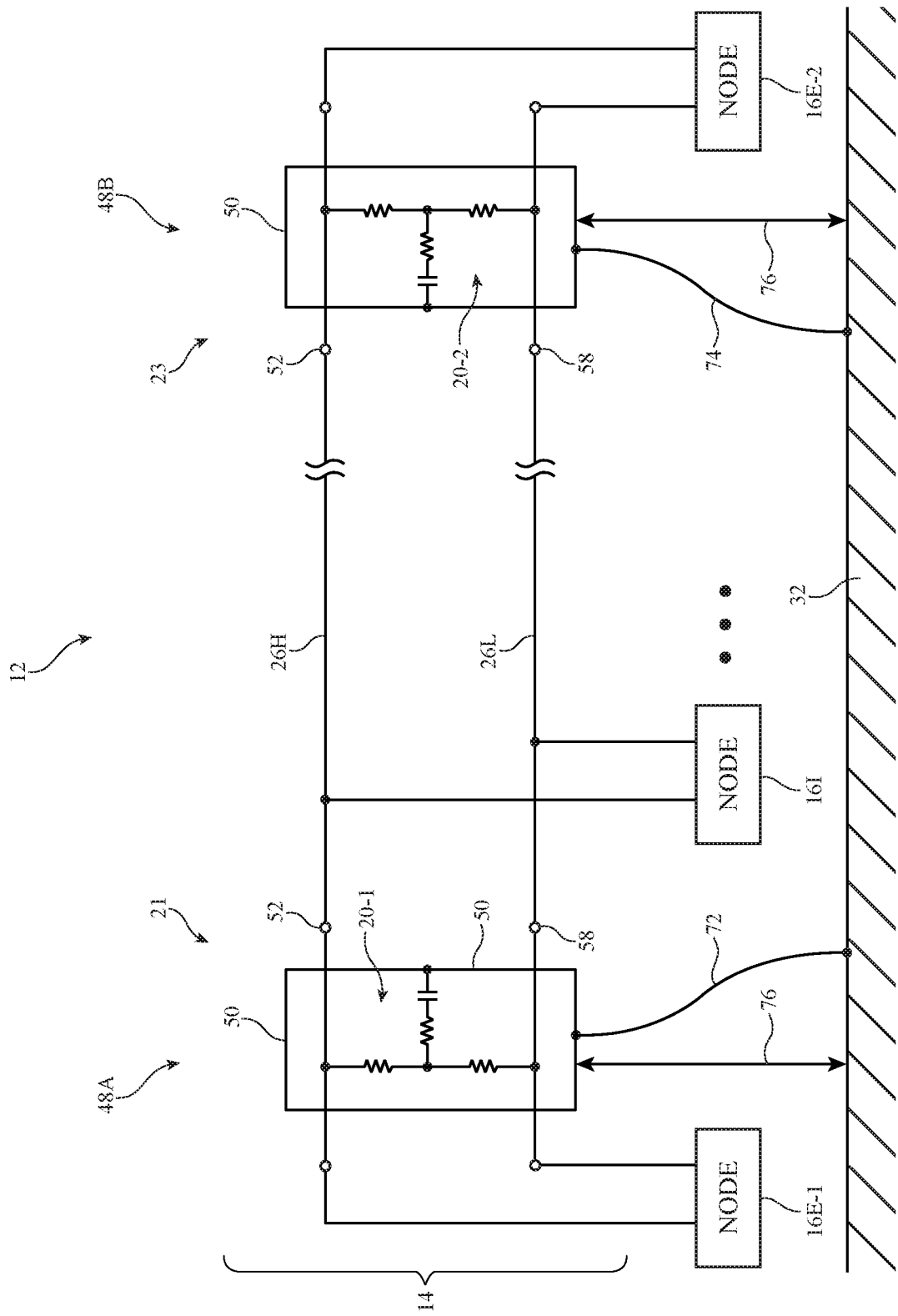
FIG. 8 is a diagram of an illustrative network having an unshielded differential data path coupled between bimodal impedance terminators in accordance with some embodiments.

FIG. 8 is a diagram showing how data path 14 may include two connectors coupled together by an unshielded cable without a dedicated ground wire. As shown in FIG. 8, connectors 48A and 48B may be coupled together by differential signal lines 26H and 26L without a cable shield such as cable shield 66 of FIG. 6 and without a dedicated ground wire such as dedicated ground wire 68 of FIG. 7. Grounded shield 50 of connector 48A may be coupled to ground 32 (sometimes referred to herein as ground plane 32) via grounding structures 72. Grounded shield 50 of connector 48B may be coupled to ground plane 32 via grounding structures 74. Grounding structures 72 and 74 may include conductive wires, metal housing structures, sheet metal, conductive adhesive, welds, solder, conductive contact pads, conductive traces on underlying substrates, conductive springs, conductive bolts (e.g., ground strap bolts), conductive pins, conductive screws, combinations of these, and/or any other desired conductive interconnect structures. Ground plane 32 may be a system ground for system 10 of FIG. 1 (e.g., a chassis or metal housing structures for system 10), as one example.

In scenarios where data path 14 does not include a dedicated ground wire or cable shield, resistance $R_G$ in bimodal impedance terminators 20-1 and 20-2 (e.g., as shown in FIG. 5) may be sensitive to the physical height of connectors 48 above the ground plane 32. If desired, grounding structures 72 and 74 may include support structures that hold (secure) connectors 48A and 48B at a fixed distance 76 from ground plane 70. The support structures may include dielectric housing structures, metal housing structures, clips, fasteners, plastic support structures, or any desired combination of these and/or any other desired support structures. Distance 76 may be selected to ensure that resistance $R_G$ has a desired value and the support structures may ensure that resistance $R_G$ and the common-mode impedance of data path 14 remains constant over time. This example is merely illustrative. If desired, ground structures such as grounding structures 72 and 74 of FIG. 8 may be used to couple connectors 48A and 48B to ground 32 in scenarios where data path 14 includes dedicated ground wire 68 (FIG. 7) and/or cable shield 66 (FIG. 6).

Figure 9:
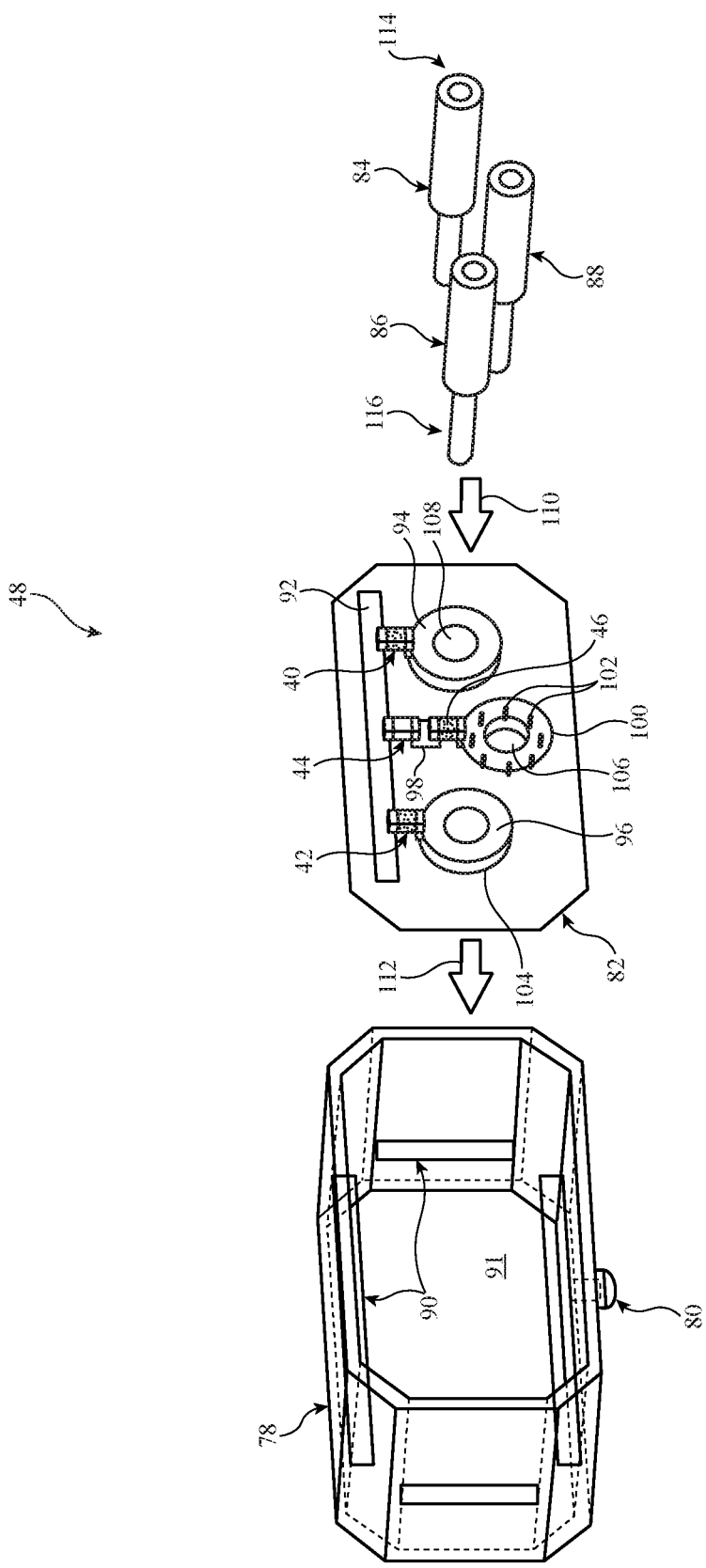
FIG. 9 is a perspective view showing how components may be assembled to form an illustrative connector having an integrated bimodal impedance terminator in accordance with some embodiments.

FIG. 9 is a perspective view showing how different components may be assembled to form connector 48 of FIG. 5 (e.g., one of connectors 48A or 48B of FIGS. 6-8). As shown in FIG. 9, connector 48 may include a conductive (metal) shell 78. Conductive shell 78 may form grounded shield 50 for connector 48 (FIG. 5). A grounding structure such as ground strap bolt 80 may be coupled to a given side of conductive shell 78. Ground strap bolt 80 may couple conductive shell 78 to ground 32 (FIG. 5). For example, ground strap bolt 80 may secure a conductive wire (e.g., a conductive wire in grounding structures 72 or 74 of FIG. 8) to conductive shell 78 to ensure that conductive shell 78 remains reliably coupled to ground over time.

Conductive shell 78 may surround (define) an interior cavity 91. If desired, conductive shell 78 may include one or more conductive ledges such as catch bars 90 within interior cavity 91. A ground plate such as ground plate 82 may be lowered into interior cavity 91 of conductive shell 78, as shown by arrow 112 of FIG. 9. Catch bars 90 may catch ground plate 82 as the ground plate is lowered into interior cavity 91 and may hold ground plate 82 in place within conductive shell 78. Ground plate 82 may be secured to catch bars 90 using conductive adhesive, solder, welds, and/or any other desired interconnect structures. In this way, ground plate 82, catch bars 90, and conductive shell 78 may all be held together at a ground potential.

A dielectric substrate such as a plastic substrate or printed circuit board (not shown in FIG. 9 for the sake of clarity) may be placed over ground plate 82. The dielectric substrate may have opposing first and second lateral surfaces. The first surface may be in contact with ground plate 82. Conductive traces used in forming bimodal impedance terminator 20 (FIG. 5) may be formed on the second surface of the dielectric substrate.

As shown in FIG. 9, the conductive traces may include a first conductive trace 92, a second conductive trace 98, a first ring-shaped conductive trace 96, a second ring-shaped conductive trace 100, and a third ring-shaped conductive trace 94. Ring-shaped conductive trace 100 may be electrically coupled to ground plate 82 over one or more conductive vias 102. Conductive vias 102 may, for example, extend through the dielectric substrate placed over ground plate 82. In this way, ring-shaped conductive trace 100 may be coupled to ground (e.g., via conductive vias 102, ground plate 82, catch bars 90, and conductive shell 78).

Ring-shaped conductive trace 96 may form terminal 36, ring-shaped conductive trace 94 may form terminal 34, and conductive trace 92 may form circuit node 38 of bimodal impedance terminator 20 (FIG. 5). Resistor 42 may couple ring-shaped conductive trace 96 to conductive trace 92. Resistor 40 may couple ring-shaped conductive trace 94 to conductive trace 92. Resistor 44 may couple conductive trace 92 to conductive trace 98. Capacitor 46 may couple conductive trace 98 to ring-shaped conductive trace 100. Resistor 42, resistor 40, resistor 44, and capacitor 46 may, for example, be formed from surface-mount components mounted to the surface of the underlying dielectric substrate formed on ground plate 82.

Ground plate 82 may include holes or openings such as openings 104, 106, and 108. Opening 104 may be aligned with the center of ring-shaped conductive trace 96. Opening 106 may be aligned with the center of ring-shaped conductive trace 100. Opening 108 may be aligned with the center of ring-shaped conductive trace 94. Conductive pins such as conductive pins 84, 86, and 88 may be placed within openings 108, 104, and 106, as shown by arrow 110 of FIG. 9.

Conductive pins 84, 86, and 88 may each have first ends 116 with a first diameter and second ends 114 with a second diameter greater than the first diameter. First ends 116 may pass through openings 104, 106, and 108 whereas second ends 114 may be too large to pass through ring-shaped conductive traces 96, 100, and 94. For example, first end 116 of conductive pin 86 may pass through ring-shaped conductive trace 96 and opening 104. Second end 114 of conductive pin 86 may rest on ring-shaped conductive trace 96. Conductive adhesive, solder, and/or welds may be used to mechanically and galvanically connect second end 114 of conductive pin 86 to ring-shaped conductive trace 96. In this way, end 116 of conductive pin 86 may form contact 60 whereas end 114 of conductive pin 86 forms contact 58 of connector 48 (FIG. 5).

Similarly, first end 116 of conductive pin 84 may pass through ring-shaped conductive trace 94 and opening 108. Second end 114 of conductive pin 84 may rest against ring-shaped conductive trace 94. Conductive adhesive, solder, and/or welds may be used to mechanically and galvanically connect second end 114 of conductive pin 84 to ring-shaped conductive trace 94. In this way, end 116 of conductive pin 84 may form contact 64 whereas end 114 of conductive pin 84 forms contact 52 of connector 48 (FIG. 5). In addition, first end 116 of conductive pin 88 may pass through ring-shaped conductive trace 100 and opening 106.

Second end 114 of conductive pin 88 may rest against ring-shaped conductive trace 100. Conductive adhesive, solder, and/or welds may be used to mechanically and galvanically connect second end 114 of conductive pin 88 to ring-shaped conductive trace 100. In this way, end 116 of conductive pin 88 may form ground contact 62 whereas end 114 of conductive pin 88 forms ground contact 54 of connector 48 (FIG. 5).

In the example of FIG. 9, ends 114 of conductive pins 84, 86, and 88 include female connector structures that are configured to receive mating male connector structures on data path 14. At the same time, ends 116 of conductive pins 84, 86, and 88 include male connector structures that are configured to be received within mating female connector structures on data path 14 (or on one of end nodes 16E-1 or 16E-2 as shown in FIGS. 6-8). This is merely illustrative. Male connector structures may be located at end 114 of conductive pins 84, 86, and 88, female connector structures may be located at end 116 of conductive pins 84, 86, and 88, male connector structures may be located at both ends of conductive pins 84, 86, and 88, female connector structures may be located at both ends of conductive pins 84, 86, and 88, or other connector structures may be used if desired. Ring-shaped conductive traces 96, 100, and 94 need not have a ring shape and may, in general, have any other desired shapes.

Figure 10:
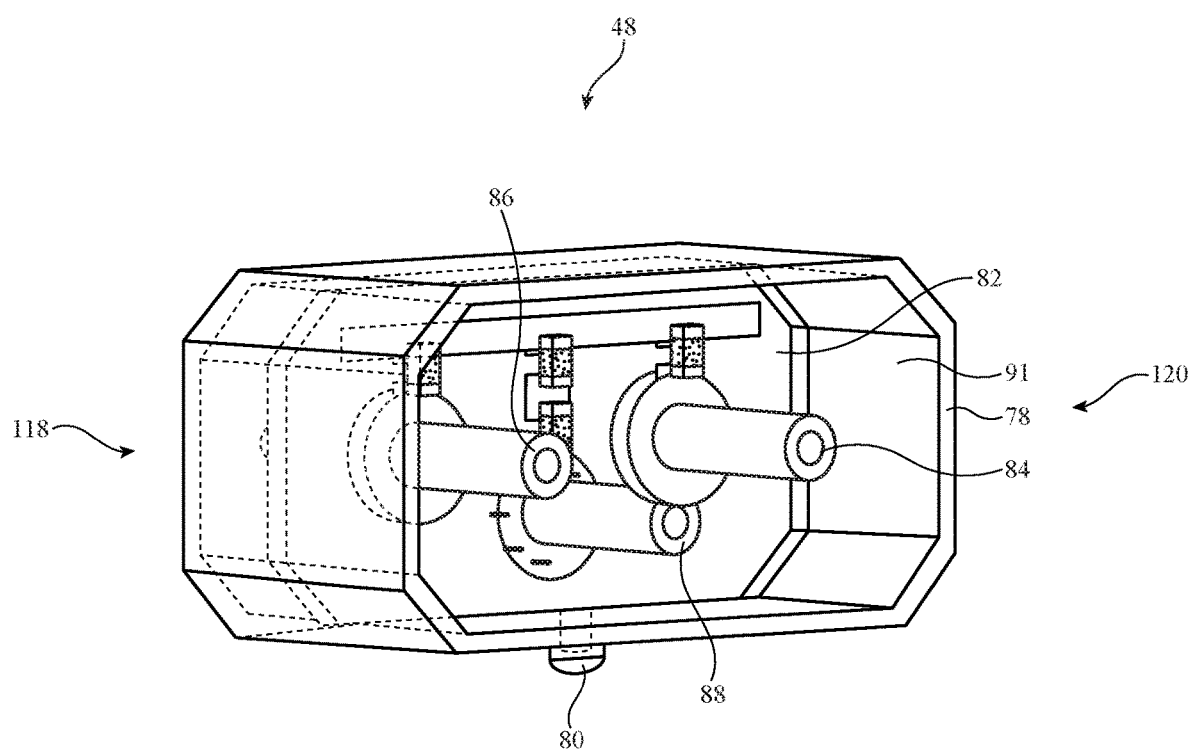
FIG. 10 is a perspective view of an illustrative assembled connector having an integrated bimodal impedance terminator in accordance with some embodiments.

FIG. 10 is a perspective view showing an assembled connector 48 (e.g., after mounting ground plate 82 to catch bars 90 and mounting conductive pins 84, 86, and 88 to ring-shaped conductive traces 94, 96, and 100, respectively). As shown in FIG. 10, the components of bimodal impedance terminator 20 are integrated within connector 48 and mounted within interior cavity 91 of conductive shell 78. Side 120 of connector 48 may be mounted to a corresponding (mating) connector on differential signal lines 26H and 26L. Side 118 of connector 48 may be mounted to a corresponding (mating) connector on a given one of end nodes 16E-1 and 16E-2 or to a corresponding connector on a cable that is coupled to a given one of end nodes 16E-1 and 16E-2 (FIGS. 6-8). Side 118 of connector 48 need not be coupled to a corresponding node 16 if desired. The example of FIGS. 9 and 10 is merely illustrative. In general, connector 48 may have any desired form factor and bimodal impedance terminator 20 may be integrated within connector 48 in any desired manner.

Forming bimodal impedance terminator 20 within one or both of connectors 48A and 48B may optimize the immunity of data path 14 to common-mode electromagnetic excitations. Consider, for example, a transmission line equivalent circuit model of a simplest-case network 12 that is provided with only two internal nodes 161 and that is subject to a common-mode external electromagnetic disturbance.

Figure 11:
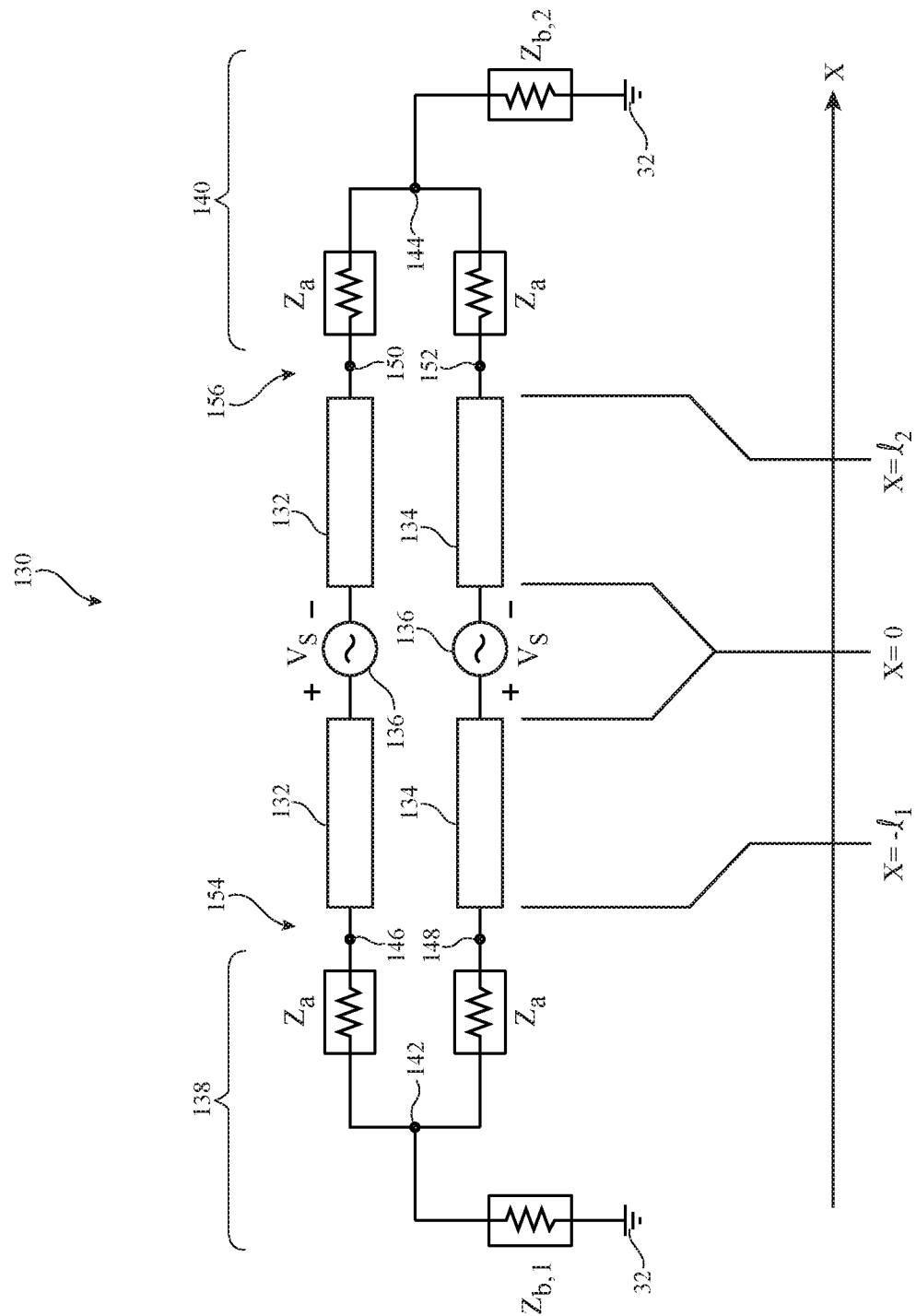
FIG. 11 is an illustrative equivalent circuit model of a transmission-line pair with minor imbalances for a network that is subject to common-mode electromagnetic excitations in accordance with some embodiments.

FIG. 11 is a diagram of an illustrative transmission line equivalent circuit model 130 for network 12 when provided with only two internal nodes 161, two impedance terminators, and a common-mode external electromagnetic disturbance. As shown in FIG. 11, differential signal line 26H of data path 14 (FIGS. 2 and 6-8) is modeled by transmission line 132 whereas differential signal line 26L is modeled by transmission line 134. Transmission lines 132 and 134 each have a length (e.g., along the X-axis of FIG. 11) that is equal to $|l_1+l_2|$.

Common-mode voltage sources 136 are coupled to transmission lines 132 and 134 and inject a common-mode voltage $V_S$ at location X=0 along the length of the transmission lines. Common-mode voltage $V_S$ may simulate a common-mode external electromagnetic disturbance on data path 14. Transmission lines 132 and 134 in model 130 each exhibit minor imbalances in per-unit-length inductance and capacitance. For example, transmission lines 132 and 134 may each exhibit per-unit-length self-capacitance C, per-unit-length mutual-capacitance $C_M$, per-unit-length capacitance imbalance of $\Delta C$, per-unit-length self-inductance L, per-unit-length mutual-inductance $L_M$, and per-unit-length inductance imbalance $\Delta L$. The ratio of per-unit-length capacitance imbalance $\Delta C$ to per-unit-length self-capacitance C (e.g., $\Delta C/C$) and the ratio of per-unit-length inductance imbalance $\Delta L$ to per-unit-length self-inductance L (e.g., $\Delta L/L$) may each be on the order of $10^{-3}$ or smaller. If transmission lines 132 and 134 are perfectly balanced, per-unit-length capacitance imbalance of $\Delta C$ and per-unit-length inductance imbalance of $\Delta L$ are each equal to zero, and the differential-mode voltages and current are all equal to zero.

Model 130 includes two impedance terminator equivalent circuits 138 and 140 at opposing ends of transmission lines 132 and 134. Impedance terminator equivalent circuit 138 includes impedance $Z_a$ coupled between transmission line 132 and circuit node 142, impedance $Z_a$ coupled between transmission line 134 and circuit node 142, and impedance $Z_{b,1}$ coupled between circuit node 142 and ground 32. Impedance terminator equivalent circuit 140 includes impedance $Z_a$ coupled between transmission line 132 and circuit node 144, impedance $Z_a$ coupled between transmission line 134 and circuit node 144, and impedance $Z_{b,2}$ coupled between circuit node 144 and ground 32.

Assuming that the transmission lines are not perfectly balanced, the modal conversion factor $\zeta$ of model 130 is given by equation 7.

$$\zeta = 0.5 * \text{MAX}\{|\xi-\eta|, |\xi+\eta|\} \quad (7)$$

In equation 7, MAX{ } is the maximum value operator that outputs the greater of its inputs $|\xi-\eta|$ and $|\xi+\eta|$, $\xi$ is a transmission line ratio defined by equation 8, and $\eta$ is a transmission line ratio defined by equation 9.

$$\xi = (C*\Delta L - L*\Delta C)/(C*L_M - L*C_M) \quad (8)$$

$$\eta = (C_M*\Delta L - L_M\Delta C)/(C*L_M - L*C_M) \quad (9)$$

The differential voltage $\Delta V(-l_1)$ at left end 154 of model 130 (e.g., between circuit nodes 146 and 148 of FIG. 10) is approximated by equation 10 and the differential voltage $\Delta V(l_2)$ at right end 156 of model 130 (e.g., between circuit nodes 150 and 152) is approximated by equation 11.

$$\Delta V(-l_1) \approx \zeta * |[1-\Gamma_{e,2}*\exp(-2*j*\beta*l_2)]*[1+\Gamma_{e,1}]|*V_s/\Delta_e \quad (10)$$

$$\Delta V(l_2) \approx \zeta * |[1-\Gamma_{e,1}*\exp(-2*j*\beta*l_1)]*[1+\Gamma_{e,2}]|*V_s/\Delta_e \quad (11)$$

In equations 10 and 11, exp( ) is the exponential operator (e.g., Euler's number raised to the power of the argument of exp( )), $\Gamma_{e,2}$ is the reflection coefficient of transmission lines 132 and 134 at location X=$l_2$, defined by equation 12, $\Gamma_{e,1}$ is the reflection coefficient of transmission lines 132 and 134 at location X=$-l_1$, defined by equation 13, $\beta$ is the common-mode propagation constant of model 130, given by equation 12, and $\Delta_e$ is a denominator factor, defined by equation 15. Common-mode propagation constant $\beta$ may sometimes referred to as even-mode propagation constant $\beta$.

$$\Gamma_{e,1} = (Z_a + 2*Z_{b,1} - 2*Z_{comm})/(Z_a + 2*Z_{b,1} + 2*Z_{comm}) \quad (12)$$

$$\Gamma_{e,2} = (Z_a + 2*Z_{b,2} - 2*Z_{comm})/(Z_a + 2*Z_{b,2} + 2*Z_{comm}) \quad (13)$$

$$\beta = \omega * \text{SQRT}([L+L_M]*[C-C_M]) \quad (14)$$

$$\Delta_e = 1 - \Gamma_{e,1}*\Gamma_{e,2}*\exp(-2*j*\beta*[l_1+l_2]) \quad (15)$$

In equations 12-15, $Z_{comm}$ is the common-mode impedance of the transmission lines (e.g., as given by equation 2) and w is the angular frequency of signals on the transmission lines. As one example (e.g., in a scenario where data path 14 is implemented using an Ethernet cable), $L \cong 9.86854*10^{-7}$ (H/m), $L_M \cong 7.29226*10^{-7}$ (H/m), $\Delta L \cong 2.0*10^{-10}$ (H/M), $C \cong 3.94471*10^{-11}$ (F/m), $C_M \cong 3.25842*10^{-11}$ (F/m), and $\Delta C \cong 1.9*10^{-14}$ (F/m), $Z_{diff} \cong 119.6$ ohms, and $Z_{comm} \cong 250$ ohms. This example is merely illustrative and, in general, the differential signal lines may have any desired inductive and capacitive characteristics (e.g., as determined by the characteristics and arrangement of the cabling used to implement data path 14).

At conditions where $\Delta_e$ approaches zero, differential voltages $\Delta V(-l_1)$ and $\Delta V(l_2)$ will peak (e.g., as shown by equations 10 and 11). However, as shown by equations 10, 11, and 15, if one or both of the reflection coefficients $\Gamma_{e,1}$ and $\Gamma_{e,2}$ drop to zero, peaks in differential voltages $\Delta V(-l_1)$ and $\Delta V(l_2)$ will vanish. As described above (e.g., as shown by equation 6), terminating data path 14 using one or more bimodal impedance terminators 20 will greatly reduce the magnitude of the reflection coefficients, thereby reducing or minimizing any peaks in differential voltages $\Delta V(-l_1)$ and $\Delta V(l_2)$.

Consider one example in which impedance $Z_a$ of model 130 is set to $0.5*Z_{diff}$ (e.g., where $Z_{diff}$ is the differential mode impedance given by equation 1) and the same termination scheme is used at both ends 154 and 156 of model 130 (e.g., ends 21 and 23 of data path 14, respectively, as shown in FIGS. 2 and 6-8). In this example, in scenarios where a single 120-ohm resistor is coupled between the transmission lines, impedance $Z_b$ in model 130 approaches infinity. This infinite impedance leaves the differential signal lines very vulnerable to external common-mode excitations and interference. In scenarios where a split termination scheme is used (e.g., where a shunting capacitance $C_t$ is coupled to one differential signal line through a first 60-ohm resistor and to the other differential signal line through a second 60-ohm resistor without resistor $R_g$ of FIG. 5), impedance $Z_b$ approaches $1/(j*\omega*C_t)$. This may reduce common-mode noise by as much as 30 dB over scenarios where impedance $Z_b$ approaches infinity. In scenarios where bimodal impedance terminator 20 is used, impedance $Z_b$ approaches $R_g+1/(j*\omega*C_t)$. This may further reduce noise by 10 dB or greater over scenarios where a split termination scheme is used.

Figure 12:
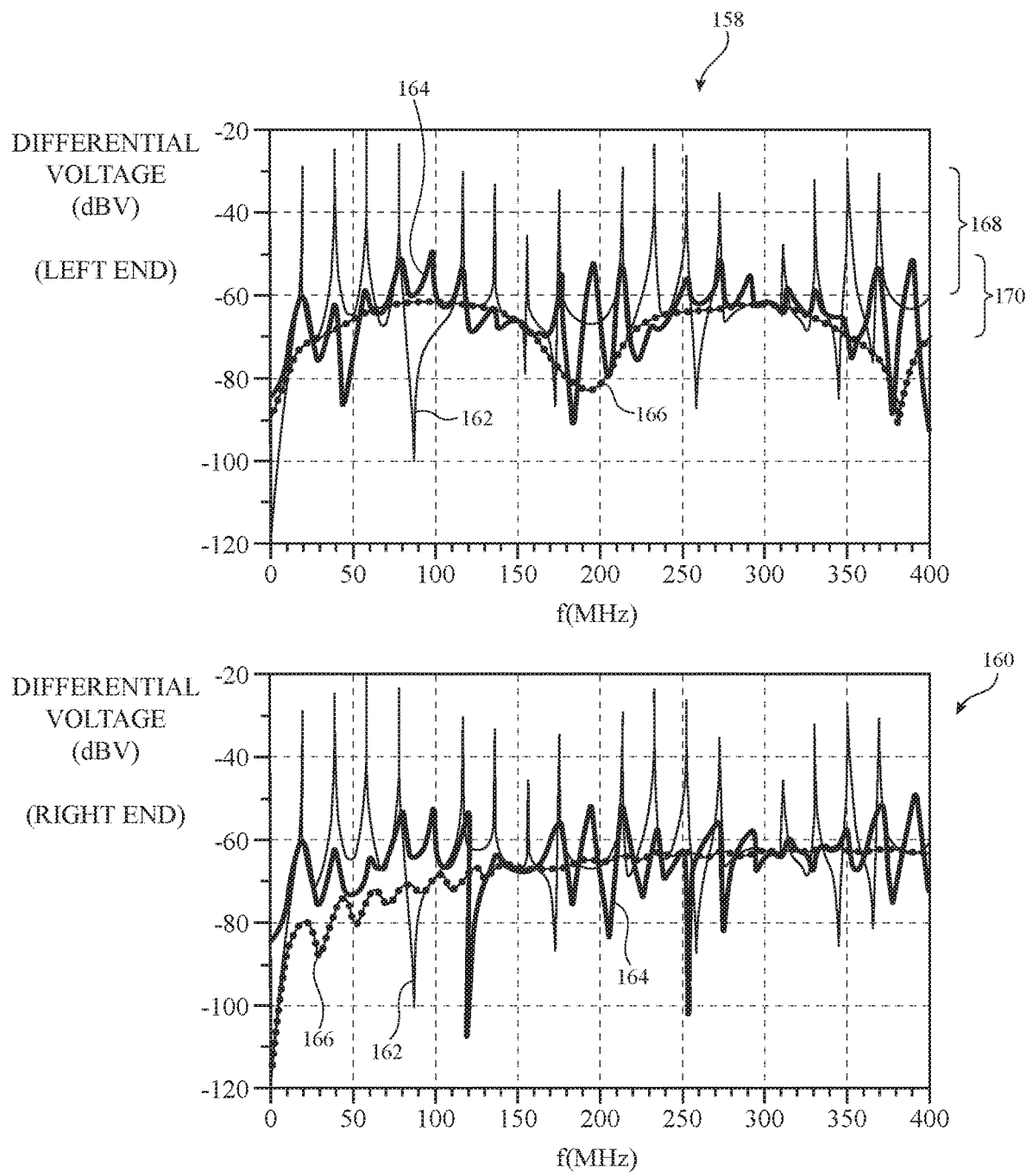
FIG. 12 is a plot of illustrative network performance (differential voltage) as a function of frequency for a network under different impedance termination schemes in accordance with some embodiments.

FIG. 12 shows graphs of the differential voltage at the ends of the data path 14 under different impedance termination schemes. In this example, the same impedance termination scheme is used at both ends of data path 14. As shown in FIG. 12, graph 158 illustrates the differential voltage (e.g., as generated using equation 10) as a function of frequency f at left end 154 of transmission lines 132 and 134 in model 130 of FIG. 11 (e.g., at end 21 of differential signal lines 26H and 26L of FIGS. 2 and 6-8). Graph 160 illustrates the differential voltage (e.g., as generated using equation 11) as a function of frequency f at right end 156 of transmission lines 132 and 134 in model 130 of FIG. 11 (e.g., at end 23 of differential signal lines 26H and 26L in FIGS. 2 and 6-8).

Curve 162 of graphs 158 and 160 plots the differential voltage in scenarios where a single 120-ohm resistor is coupled between the differential signal lines. The infinite common-mode impedance in this scenario may cause excessive signal reflections at both ends of the data path and may leave the data path susceptible to external common-mode noise. This noise may generate relatively large signal peaks 168 in the differential voltage, which can generate an excessive number of errors in the data conveyed over the data path.

Dark curve 164 of graphs 158 and 160 plots the differential voltage in scenarios where a split termination scheme is used (e.g., where a shunting capacitance $C_t$ is coupled to one differential signal line through a first 60-ohm resistor and to the other differential signal line through a second 60-ohm resistor without resistor $R_g$ of FIG. 5). Using a split termination scheme may reduce the common-mode impedance discontinuity and thus signal reflection at the ends of the data path relative to the arrangement associated with curve 162. However, the data path may still be susceptible to common-mode noise, as shown by peaks 170. While peaks 170 are smaller than peaks 168 (e.g., by as much as 40 dB), this noise can still introduce an excessive number of errors in the data conveyed over the data path.

Dotted curve 166 of graphs 158 and 160 plots the differential voltage in scenarios where bimodal impedance terminator 20 is coupled to both ends of the data path (e.g., where bimodal impedance terminator 20-1 is coupled to end 21 and bimodal impedance terminator 20-2 is coupled to end 23 of data path 14 as shown in FIGS. 2 and 6-8). Bimodal impedance terminators 20-1 and 20-2 may terminate the common-mode impedance of the data path and may thereby reduce or minimize signal reflection at both ends of the data path (e.g., bimodal impedance terminators 20-1 and 20-2 may reduce reflection coefficients $\Gamma_{e,1}$ and $\Gamma_{e,2}$ to zero). This may serve to reduce or minimize peaks in the differential voltage. As shown by dotted curve 166, any peaks in the differential voltage are smaller than the peaks in dark curve 164 (e.g., by 10 dB or greater). This differential voltage peak reduction may reduce or eliminate common-mode noise from the data path, thereby mitigating any common-mode noise-related errors in the data conveyed over the data path. The example of FIG. 12 is merely illustrative. In general, curves 164, 166, and 162 may have other shapes. If desired, data path 14 may include a bimodal impedance terminator at only one end while still exhibiting satisfactory common-mode performance.

Figure 13:
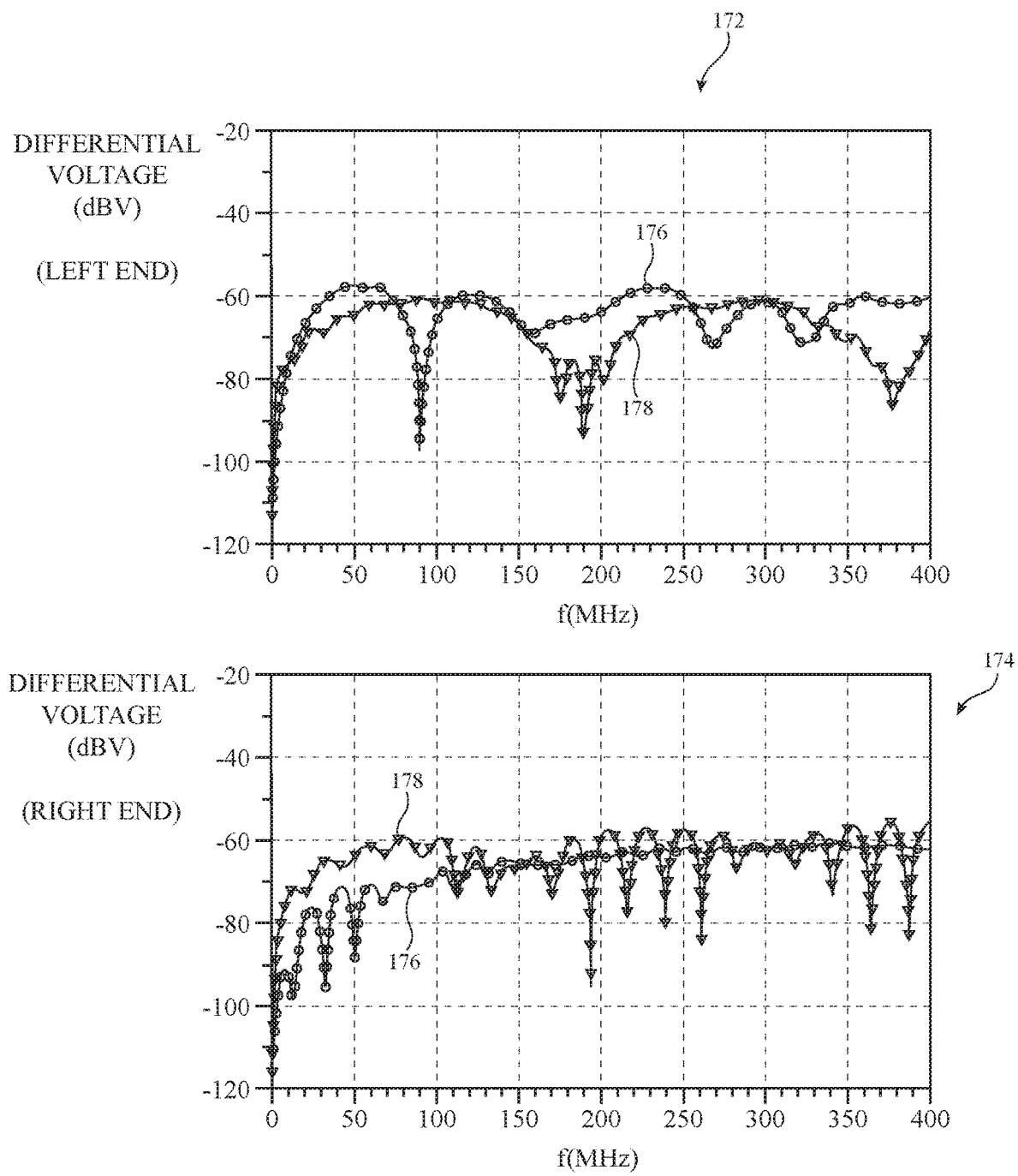
FIG. 13 is a plot of illustrative network performance (differential voltage) as a function of frequency for a network having a bimodal impedance terminator at only one end of the network in accordance with some embodiments.

FIG. 13 shows graphs of the differential voltage at the ends of the data path 14 when bimodal impedance terminator 20 is only coupled to a single end of the data path. As shown in FIG. 13, graph 172 illustrates the differential voltage (e.g., as generated using equation 10) as a function of frequency f at left end 154 of transmission lines 132 and 134 in model 130 of FIG. 11 (e.g., at end 21 of differential signal lines 26H and 26L of FIGS. 2 and 6-8). Graph 174 illustrates the differential voltage (e.g., as generated using equation 11) as a function of frequency f at right end 156 of transmission lines 132 and 134 in model 130 of FIG. 11 (e.g., at end 23 of differential signal lines 26H and 26L in FIGS. 2 and 6-8).

Curve 176 of graphs 172 and 174 plots the differential voltage in scenarios where a bimodal impedance terminator 20 is only coupled to left end 21 of differential signal lines 26H and 26L of FIGS. 2 and 6-8. Curve 178 of graphs 172 and 174 plots the differential voltage in scenarios where a bimodal impedance terminator 20 is only coupled to right end 23 of differential signal lines 26H and 26L of FIGS. 2 and 6-8. A single 120-ohm resistor or any other desired termination scheme may be used to terminate the end of data path 14 opposite to the bimodal impedance terminator.

As shown by curves 176 and 178, bimodal impedance terminator 20 will still reduce peaks in differential voltage when coupled to only a single end of the data path relative to scenarios where a single 120-ohm resistor is used to terminate both ends (e.g., as shown by curve 162 of FIG. 12). Bimodal impedance terminator 20 may reduce the peaks in differential voltage to approximately the magnitude of peaks 170 associated with curve 164 of FIG. 12 or, at some frequencies, may reduce the peaks in differential voltage to even smaller than the magnitude of peaks 170. In other words, bimodal impedance terminator 20 may still reduce or minimize signal reflection and common-mode noise relative to other termination schemes, even when only a single bimodal impedance terminator 20 is coupled to data path 14. The example of FIG. 13 is merely illustrative. In general, curves 176 and 178 may have other shapes.

The foregoing is merely illustrative and various modifications can be made to the described embodiments. The foregoing embodiments may be implemented individually or in any combination.

What is claimed is:

1. A connector configured to be coupled to a differential pair of signal lines that have a differential-mode impedance and a common-mode impedance, the connector comprising:
   a bimodal impedance terminator configured to terminate both the differential-mode impedance and the common-mode impedance of the differential pair of signal lines while the connector is coupled to the differential pair of signal lines;
   a conductive shell that defines an interior cavity;
   a grounding structure that couples the conductive shell to a ground plane;
   a ground plate received within the interior cavity and electrically coupled to the ground plane through the conductive shell; and
   a dielectric substrate on the ground plate, wherein the bimodal impedance terminator comprises conductive traces on the dielectric substrate.

2. The connector defined in claim 1, further comprising:
   a first conductive contact configured to be coupled to a first signal line in the differential pair of signal lines; and
   a second conductive contact configured to be coupled to a second signal line in the differential pair of signal lines.

3. The connector defined in claim 2,
   the bimodal impedance terminator comprising:
      a first resistor between a circuit node and the first conductive contact;
      a second resistor between the circuit node and the second conductive contact;
      a third resistor between the circuit node and the grounded shield; and
      a capacitor between the circuit node and the grounded shield in series with the third resistor.

4. The connector defined in claim 3 wherein first, second, and third openings are formed in the ground plate, the connector further comprising:
   a conductive via coupled between the conductive traces and the ground plate;
   a first conductive pin that extends through the first opening;
   a second conductive pin that extends through the second opening; and
   a third conductive pin that extends through the third opening, wherein the first, second and third conductive pins are coupled to the conductive traces, the first conductive pin forms the first conductive contact, the second conductive pin forms the second conductive contact, and the third conductive pin is shorted to the ground plate by the conductive via.

5. The connector defined in claim 3, further comprising:
   a conductive catch bar mounted to the conductive shell within the interior cavity, wherein the ground plate is affixed to the conductive catch bar.

6. The connector defined in claim 3, wherein the grounding structure comprises a support structure configured to hold the connector at a fixed distance from the ground plane.

7. The connector defined in claim 2, further comprising:
   a third conductive contact configured to be coupled to a network node; and
   a fourth conductive contact configured to be coupled to the network node, wherein the third conductive contact is coupled to the first conductive contact and the fourth conductive contact is coupled to the second conductive contact.

8. A data bus comprising:
   opposing first and second ends, wherein the data bus is configured to convey differential signals between at least two network stub nodes that are coupled to the differential data bus between the first and second ends;
   first and second differential signal lines configured to convey the differential signals, the first and second differential signal lines having a differential-mode impedance and a common-mode impedance;
   a grounded shield defining an interior cavity;
   a conductive catch bar within the interior cavity and coupled to the grounded shield;
   a dielectric substrate within the interior and mounted to the conductive catch bar; and
   an impedance terminating circuit on the dielectric substrate and coupled to the first and second differential signal lines at the first end of the data bus, wherein the impedance terminating circuit is configured to terminate both the differential-mode impedance and the common-mode impedance and comprises:
      a first resistor coupled between the first differential signal line and a circuit node;
      a second resistor coupled between the second differential signal line and the circuit node;
      a third resistor coupled between the circuit node and a reference potential; and
      a capacitor coupled between the circuit node and the reference potential in series with the third resistor.

9. The data bus defined in claim 8, wherein the first and second differential signal lines comprise a twisted pair of wires and the data bus further comprises:
   a cable shield that surrounds the twisted pair of wires and that is coupled to the reference potential.

10. The data bus defined in claim 8, further comprising:
    a dedicated ground wire coupled between the first and second ends of the data bus, the dedicated ground wire being coupled to the reference potential.

11. The data bus defined in claim 8, further comprising:
    an additional impedance terminating circuit coupled to the first and second differential signal lines at the second end of the data bus, wherein the additional impedance terminating circuit is configured to terminate both the differential-mode impedance and the common-mode impedance and comprises:
       a fourth resistor coupled between the first differential signal line and an additional circuit node;
       a fifth resistor coupled between the second differential signal line and the additional circuit node;
       a sixth resistor coupled between the additional circuit node and the reference potential; and an additional capacitor coupled between the additional circuit node and the reference potential in series with the sixth resistor.

12. An impedance terminator for a data bus having first and second differential signal lines, the impedance terminator comprising:
   a dielectric substrate having opposing first and second surfaces, a conductive trace at the first surface, and an opening extending from the first surface to the second surface;
   a first resistor on the dielectric substrate and coupled between the first differential signal line and a circuit node;
   a second resistor on the dielectric substrate and coupled between the second differential signal line and the circuit node;
   a capacitor on the dielectric substrate and coupled between the circuit node and a ground;
   a third resistor mounted to the first surface of the dielectric substrate and coupled between the circuit node and the ground;
   a ground plate on the second surface of the dielectric substrate;
   a conductive via that extends through the dielectric substrate and that couples the conductive trace to the ground plate; and
   a conductive pin that extends through the opening and that is electrically coupled to the conductive trace.

13. The impedance terminator of claim 12, wherein the third resistor is coupled between the circuit node and the ground in series with the capacitor.

14. The impedance terminator of claim 13, wherein the first resistor has a first resistance, the second resistor has the first resistance, and the third resistor has a second resistance greater than the first resistance.

15. The impedance terminator of claim 14, wherein the first and second differential signal lines exhibit a common-mode impedance and a differential-mode impedance, the third resistance being within 10% of the common-mode impedance minus one-quarter of the differential-mode impedance.

16. The impedance terminator of claim 14, wherein the first and second differential signal lines exhibit a common-mode impedance and a differential-mode impedance, the third resistance being within 10% of the common-mode impedance minus one-quarter of the differential-mode impedance.

17. The impedance terminator of claim 16, wherein the first and second resistances are each within 10% of one-half of the differential-mode impedance.

18. The impedance terminator of claim 17, wherein the capacitor has a capacitance between 1.0 nF and 10.0 nF.

19. The impedance terminator of claim 14 wherein the first and second differential signal lines exhibit a common-mode impedance and a differential-mode impedance, the impedance terminator being configured to terminate both the common-mode impedance and the differential-mode impedance of the first and second differential signal lines.

20. The impedance terminator of claim 19, wherein the third resistor has a resistance that is within 10% of the common-mode impedance minus one-quarter of the differential-mode impedance.

21. The impedance terminator of claim 14, wherein the first and second differential signal lines convey a differential signal at a frequency, and wherein the first and second differential signal lines exhibit, at the frequency, a differential-mode impedance and a common-mode impedance, the common-mode impedance being greater than the differential-mode impedance.

22. The impedance terminator of claim 14, wherein the first resistor, the second resistor, and the capacitor are mounted to the first surface of the dielectric substrate, the dielectric substrate further comprising a first additional conductive trace coupled to the first resistor, a second additional conductive trace coupled to the second resistor, and first and second additional openings extending from the first surface to the second surface.

23. The impedance terminator of claim 22, further comprising:
   a first additional conductive pin that extends through the first additional opening and that is electrically coupled to the first additional conductive trace; and
   a second additional conductive pin that extends through the second additional opening and that is electrically coupled to the second additional conductive trace.

* * * * *

UNITED STATES PATENT AND TRADEMARK OFFICE
CERTIFICATE OF CORRECTION

PATENT NO. : 10,592,458 B1
APPLICATION NO. : 16/134811
DATED : March 17, 2020
INVENTOR(S) : Hao Shi et al.

Page 1 of 1

It is certified that error appears in the above-identified patent and that said Letters Patent is hereby corrected as shown below:

In the Claims

Column 19, Line 39, Claim 15 "third resistance being within" should read --second resistance being within--

Column 20, Line 2, Claim 16 "third resistance being within" should read --second resistance being within--

Signed and Sealed this
Twelfth Day of May, 2020

Andrei Iancu
*Director of the United States Patent and Trademark Office*